(12) United States Patent
Ottesen et al.

(10) Patent No.: US 6,556,371 B1
(45) Date of Patent: Apr. 29, 2003

(54) GENERATION OF HIGHER-ORDER HARMONIC SINE AND COSINE SEQUENCES BY INDEXING A FIRST-ORDER SINE/COSINE TABLE

(75) Inventors: Hal Hjalmar Ottesen, Rochester, MN (US); Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 09/598,234

(22) Filed: Jun. 21, 2000

(51) Int. Cl.[7] ............................................... G11B 5/596
(52) U.S. Cl. .................................. 360/77.04; 360/77.08
(58) Field of Search ............................... 360/77.04, 75, 360/77.02, 78.04, 78.01

(56) References Cited

U.S. PATENT DOCUMENTS

| | | | | |
|---|---|---|---|---|
| 5,926,338 A | * | 7/1999 | Jeon et al. | 360/77.04 |
| 2001/0043428 A1 | * | 11/2001 | Morris et al. | 360/77.04 |
| 2002/0039248 A1 | * | 4/2002 | Liu et al. | 360/77.04 |

* cited by examiner

*Primary Examiner*—Andrew L. Sniezek
(74) *Attorney, Agent, or Firm*—Bracewell & Patterson, LLP; Roy W. Truelson (57) ABSTRACT

A method of generating a higher-order trigonometric sequence, by constructing a table having a first-order trigonometric sequence, indexing the table to yield a different sequence based on an order number of a desired higher-order harmonic, and catenating values in the table according to the different sequence to yield a higher-order trigonometric sequence whose order is the order number. The table may be a first-order sine sequence, with the method yielding a higher-order sine sequence, or the table may be a first-order cosine sequence, with the method yielding a higher-order cosine sequence. The table has a period N, and indexing is accomplished by computing pointer indices equal to (k*n) mod(N), where k is the order number, and $0 \leq n < N$. In the special case where N is a multiple of 4, a single table may be used for both higher-order sine and higher-order cosine sequences. This method may be applied to the calculation of a local PES-correction value for at least one track of a direct access storage device. The local PES-correction value is then used to position a read/write head of the direct access storage device over the track. The PES-correction value for the track may be stored on a sector of the direct access storage device.

16 Claims, 8 Drawing Sheets

402 Initialize: N, n=0:(N-1), w0 = 2*pi/N

404 Compute: rro(n, jj) = (1/M) SUM [PES(n, ii, jj)], cf., Eq. (1)

406 Compute 1-st harmonic DFT = RRO (1, jj)

408 Compute k-th DFS coefficients: a(1, jj), b(1, jj); cf., Eq. (3)

410 rroc(n, jj) = rro(n, jj) - a(1, jj)* cos(w0*n)-b(1, jj)*sin (w0*n)

412 PES correction: cPES(n, jj) = PES(n, jj) - rroc(n, jj)

GENERATION OF HIGHER-ORDER HARMONIC SINE AND COSINE SEQUENCES BY INDEXING A FIRST-ORDER SINE/COSINE TABLE

BACKGROUND OF THE INVENTION

1. Field of the Invention

The present invention-generally relates to the computation of trigonometric expressions, and more specifically to a method and apparatus for generating higher-order sine and cosine sequences. The invention is particularly useful in direct access storage devices (e.g., hard disk drives) of a computer system, for reducing the effects of local, repeatable position errors which can otherwise lead to track misregistration.

2. Description of Related Art

In modern manufacturing and design, there is a constant desire to reduce the size (and weight) of nearly every type of consumer product, including various electromechanical devices. As these devices become ever smaller, and more complicated, they place increasingly difficult demands on system designers to improve the precision and accuracy of any moving parts which require exact registration or positioning. One example of this trend may be found in direct access storage devices (DASDs) used by computer systems for permanent retention of data and application programs.

Figure 1:
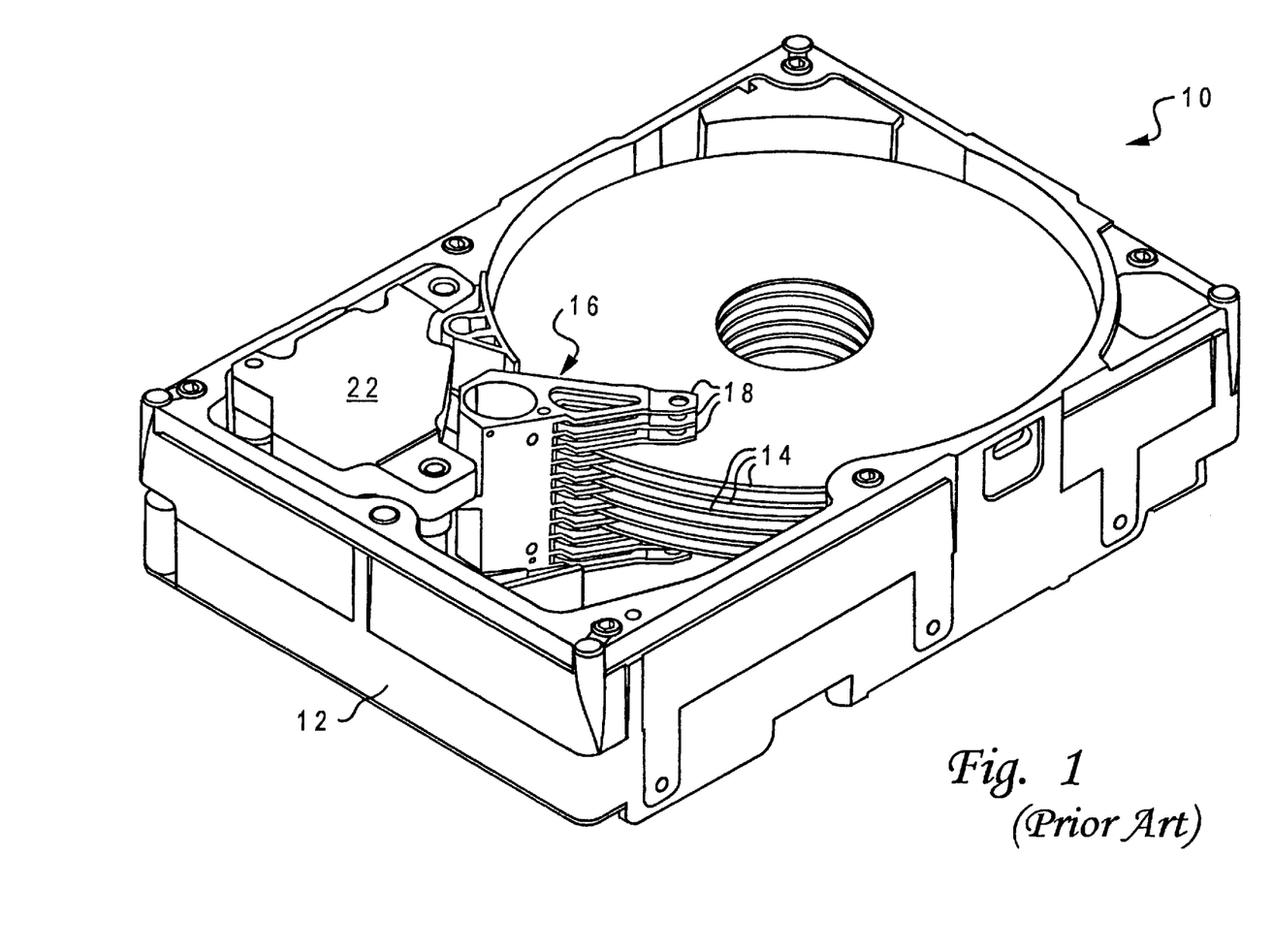
FIG. 1 is a perspective view of a conventional hard disk drive (HDD)

The most common type of DASD in use today is often referred to as a hard disk drive, or HDD. FIG. 1 depicts an exemplary HDD 10 constructed in accordance with the prior art. HDD 10 has a shroud or enclosure 12, a plurality of disks 14, a rotary actuator assembly 16, and associated control electronics (not shown). A cover which is part of enclosure 12 has been removed in FIG. 1. Disks 14 are appropriately mounted on a spindle 20 which is attached to a spindle motor, and thus rotatable with respect to enclosure 12.

The upper and lower surfaces of each of the disks 14 are coated with a magnetic material to allowing the writing of data onto the surfaces using the principle of magnetic induction. Rotary actuator assembly 16 has a plurality of arm/suspension members 18 supporting electromagnetic transducers (heads) at their tips, which are used to read data from and write data to the magnetic media-bearing surfaces of disks 14. The movement of actuator assembly 16 is controlled by a voice-coil motor (VCM) 22.

The magnetic media-bearing surfaces of disks 14 have a plurality of generally concentric tracks for recording blocks of information. Each of these tracks is divided into multiple sectors. The theoretical location of any given set of data bits can accordingly be computed based on the track number and position within the particular sector. Based on this assumed location, the HDD control electronics generate appropriate electrical signals that cause VCM 22 to move the read/write heads on arm/suspension members 18 over the desired portions of disks 14. Thus, when the heads have been located over the proper tracks, as the disks 14 are spinning, data can be read from or written to the tracks via the inductive heads.

Not surprisingly, the read/write heads on the arm/suspension assembly may not achieve a perfect registration with the desired tracks of the spinning disks. Many such position errors are repeatable, although they may vary from track-to-track. Spatial frequency analysis of the repeatable position error (RRO) from track-to-track reveals substantial differences in the harmonic signal content. Very low correlation between phase and amplitude of second and higher harmonic ("local") RROs for adjacent tracks have been observed. The first harmonic ("global") RRO, which expresses a disk-slip, is usually well correlated between tracks on a given surface.

The large variations in RRO from track-to-track can often be attributed to characteristics which are fixed during the servo-track-write (STW) time. Factors that may contribute to local RRO include: arm and suspension resonances at STW; spindle bearing frequencies at STW; airflow and turbulence at STW; external vibrations at STW; media defects (low coercivity) that changes the integrity of the linearity and offset of the local servo-pattern transfer function; and spindle imbalance. The repeatable runout, frozen in at STW time, reflects arm/suspension and bearing resonances in the mechanical disk drive structure. When the actuator tries to follow the frozen-in track, the mechanical forces (vibrations) generated will be of frequencies that may re-excite the resonances in the structure. Servo writing at a lower RPM might reduce the re-excitement of some of the arm/suspension resonances, but this adds to I/O latencies.

The prior art uses various techniques to attempt to correct misregistrations of the read/write heads. For example, a position error signal (PES) may be generated as the head attempts to read track information, and this PES can be used to correct the head location. There are limits on the effectiveness of PES correction, however, particularly relating to the amount of time that is required to generate and process the PES to provide the corrective factor. As the physical size of DASDs shrinks, the foregoing problems are only exacerbated further. It would, therefore, be desirable to devise an improved method for high speed generation of track registration information. It would be further advantageous if the method could provide an in-situ, seal-healing approach to reduce the effects of local repeatable position errors on all tracks in a DASD. Such a method would benefit from improvements in calculating higher-order harmonics (i.e., sine and cosine sequences) that could implement local feedforward and PES-correction in a lowcost and efficient manner. Common algorithms, like the recursive Chebyshev polynomial algorithm, have been employed for generating such higher-order sequences, but such algorithms require a series of multiplications and are not suitable in fast, real-time applications with limited computational capabilities.

SUMMARY OF THE INVENTION

It is therefore one object of the present invention to provide an improved method of registering moving parts within an electromechanical device.

It is another object of the present invention to provide such a method which may be used to improve track registration in a direct access storage device.

It is yet another object of the present invention to provide a lowcost and efficient method of generating higher-order sine and cosine sequences that may be used for correcting registration of such moving parts.

The foregoing objects are achieved in a method of generating a higher-order trigonometric sequence, generally comprising the steps of constructing a table having a plurality of values arranged as a finite-length, first-order trigonometric sequence, indexing the table to yield a different sequence of the values, based on an order number of a desired higher-order harmonic, and catenating the values according to the different sequence to yield a higher-order trigonometric sequence whose order is the order number. The table may be a finite-length, first-order sine sequence, with the method yielding a higher-order sine sequence, or the table may be a finite-length, first-order cosine sequence, with the method yielding a higher-order cosine sequence. The table has a period N, and the indexing step computes a plurality of pointer indices equal to (k*n)mod(N), where k is the order number, and $0 \leq n < N$. In the special case where N is a multiple of 4, a single table may be used for both higher-order sine and higher-order cosine sequences.

The method of generating the higher-order trigonometric sequences may advantageously be applied to the calculation of a local PES-correction value for at least one track of a direct access storage device. The local PES-correction value is then used to position a read/write head of the direct access storage device over the track. In a preferred implementation, the PES-correction value for the track is stored on a sector of the direct access storage device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention provides an in-situ, seal-healing approach to reduce the effects of-local repeatable position errors (RRO) on all tracks in a direct access storage device (DASD). The net result of applying the method is a significantly improved write-to-write track misregistration (WWTMR) and an improved write-to-read track misregistration (WRTMR) Reduced track misregistration leads to higher track densities and improved servo performance.

Figure 2:
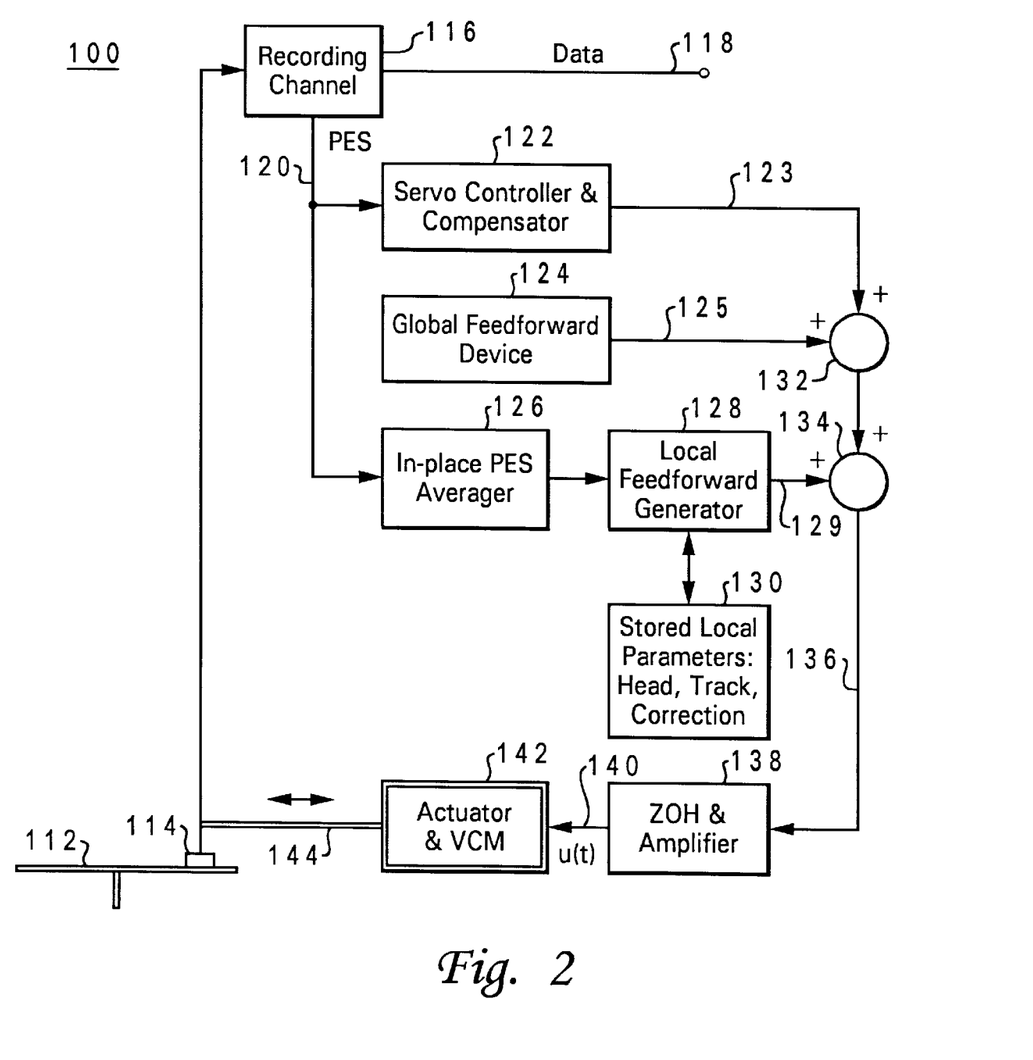
FIG. 2 is a block diagram of one embodiment of a feedforward apparatus for a direct access storage device (DASD) constructed in accordance with the present invention.

A block diagram of one embodiment of a local feedforward apparatus 100 constructed in accordance with the present invention is shown in FIG. 2. Local feedforward device 100 is adapted for use with a direct access storage device such as that shown in FIG. 1, having a plurality of disks with magnetic media-bearing surfaces. When disks 112 are spinning, heads 114 are in a track-following control mode positioned via arm/suspension links 144 by an actuator and voice-coil motor (VCM) 142. Customer data and servo information is interlaced in periodically (N times per disk revolution). The readback signal from user-selected head 114 is fed into a recording channel 116. The read signal is time-partitioned into user-data on line 118 and position error signal (PES) information on line 120 several times (N) per disk revolution.

The PES on line 120 is entered into a servo controller and compensator 122 and in-place PES-average 126 for individual PES processing. A servo controller and compensator algorithm 122 provides a control output 123 which is added in summer 132 to the control output 125 from a conventional (global) feedforward device 124. The output from summer 132 is added to the output 129 of local feedforward generator 128 in summer 134. The output 136 from summer 134 is the final composition of the control signal that is supplied to a zero-order-hold (ZOH) and amplifier 138. The output line 140 from the ZOH and amplifier 138 provides a current u(t) to the voice-coil actuator 142.

In-place PES-averager 126 computes the local, discrete-time repeatable runout (rro(n,jj)) for a local track (jj) and all sectors $0 \leq n < (N-1)$. The process is defined in equation (1) below by the in-place averaging of the raw position error signal PES(n, ii, jj) on line 120 over M complete revolutions:

$$rro(n,jj)=(1/M)\Sigma_{ii}[PES(n, ii, jj)], \quad (1)$$

where $1 \leq ii \leq M$. The spatial spectral content of the lower harmonics ($2 \leq k \leq Q$) in the local runout rro(n,jj) is analyzed in local feedforward generator 128 using Goertzel's discrete Fourier transform (DFT) algorithm. Harmonic square magnitudes RR(k, jj), exceeding a certain power threshold P(jj), are retained and a local feedforward signal ff(k, jj) is generated from the discrete Fourier series $$ff(n,jj)=\Sigma_h[a(h,jj)*\cos(h*w_o*n)+b(h,jj)*\sin(h*w_o*n)], \quad (2)$$

where h is a vector of the local harmonic numbers k exceeding the threshold P(jj). The discrete Fourier series parameters a(h,jj) and b(h,jj) are given by equation 3:

$$a(h,jj)=2*\text{real}[RRO(h,jj)]/N$$

$$b(h,jj)=2*\text{imag}[RRO(h,jj)]/N \quad (3)$$

These parameters are stored in local storage 130, or-the computed local feedforward ff(n,jj) in equation (2) could be stored in a distributed way on the local track (jj) as discussed further below.

Figure 3:
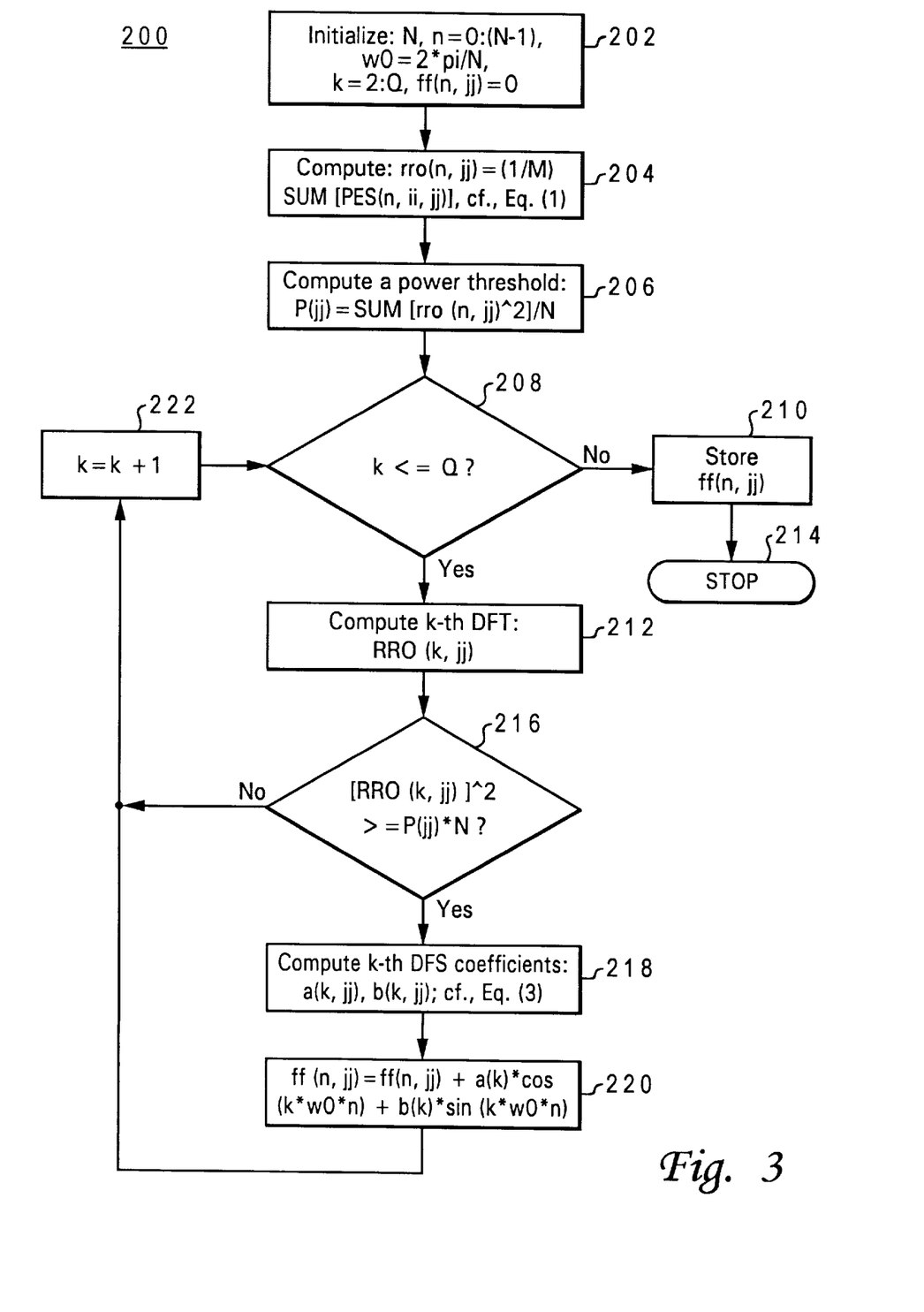
FIG. 3 is a flow chart depicting operation of the local feedforward generator included in the feedforward apparatus of FIG. 2.

The operation of the local feedforward generator 128 is described in detail in the flow-diagram in FIG. 3. Process 200 begins with the initialization of variables in block 202. The number of sectors N, the index n=0:(N−1), the discrete-time frequency $w_o=2\pi/N$, the local harmonic index number k=2:Q, and the local feedforward ff(n,jj) for track jj, are initialized. Observe that the first harmonic component is excluded in the local feedforward. The value for the highest harmonic number used (Q) for feedforward is related to the closed loop bandwidth of the servo. For example, if the closed loop bandwidth of the servo system was 1,200 Hz and the disks were spinning at 7200 RPM, then Q=1200/(7,200/60)=10. In other words, in this implementation, harmonics up to and including the tenth harmonic are incorporated in the local feedforward signal. Using equation (1), the local rro(n,jj) is computed, in block 204, from an in-place (in-sector) averaging of the measured raw PES(n,ii,jj) on local track jj over M complete revolutions. A typical value for M is ten revolutions. A local power-threshold value P(jj) based on the mean-square-sum of the local rro(n,jj) is computed in block 206 using equation (2). The value of the harmonic number k is compared with Q in block 208. If k≦Q then the local kth harmonic DFT value RRO(k,jj) is generated in block 212. If k>Q, then block 210 may conveniently use Goertzel's algorithm or another discrete-time Fourier transform for the computation.

Next, the square value of the magnitude of RRO(k,jj) is compared with the power-threshold P(jj) in decision device 216. If the square of the magnitude of RRO(k,jj) is less than P(jj), then the harmonic index is augmented by one in block 222 and the process in block 216 is repeated for k≦Q. If the square of the magnitude of RRO(k,jj) is larger or equal to P(jj), then the local kth harmonic discrete Fourier series (DFS) coefficients a(k,jj) and b(k,jj) are computed in block 218.

The kth harmonic sequence vector ff(n, k,jj) is calculated in block 220 and added to the local previous feedforward vector ff(n,jj). The harmonic $\cos(k*w_o*n)$-sequence and harmonic $\sin(k*w_o*n)$-sequence are generated via the methods disclosed further below, by indexing a first-order sine/cosine table. The process is then repeated by incrementing the harmonic number k by one and repeating the process until k>Q. Then the value of the feedforward vector ff(n,jj) is stored in block 210 and the process stops. The values for ff(n,jj) could be stored in RAM, but it is deemed preferable to store them distributively on the specific local track jj (as suggested below in conjunction with FIG. 6).

Figure 4:
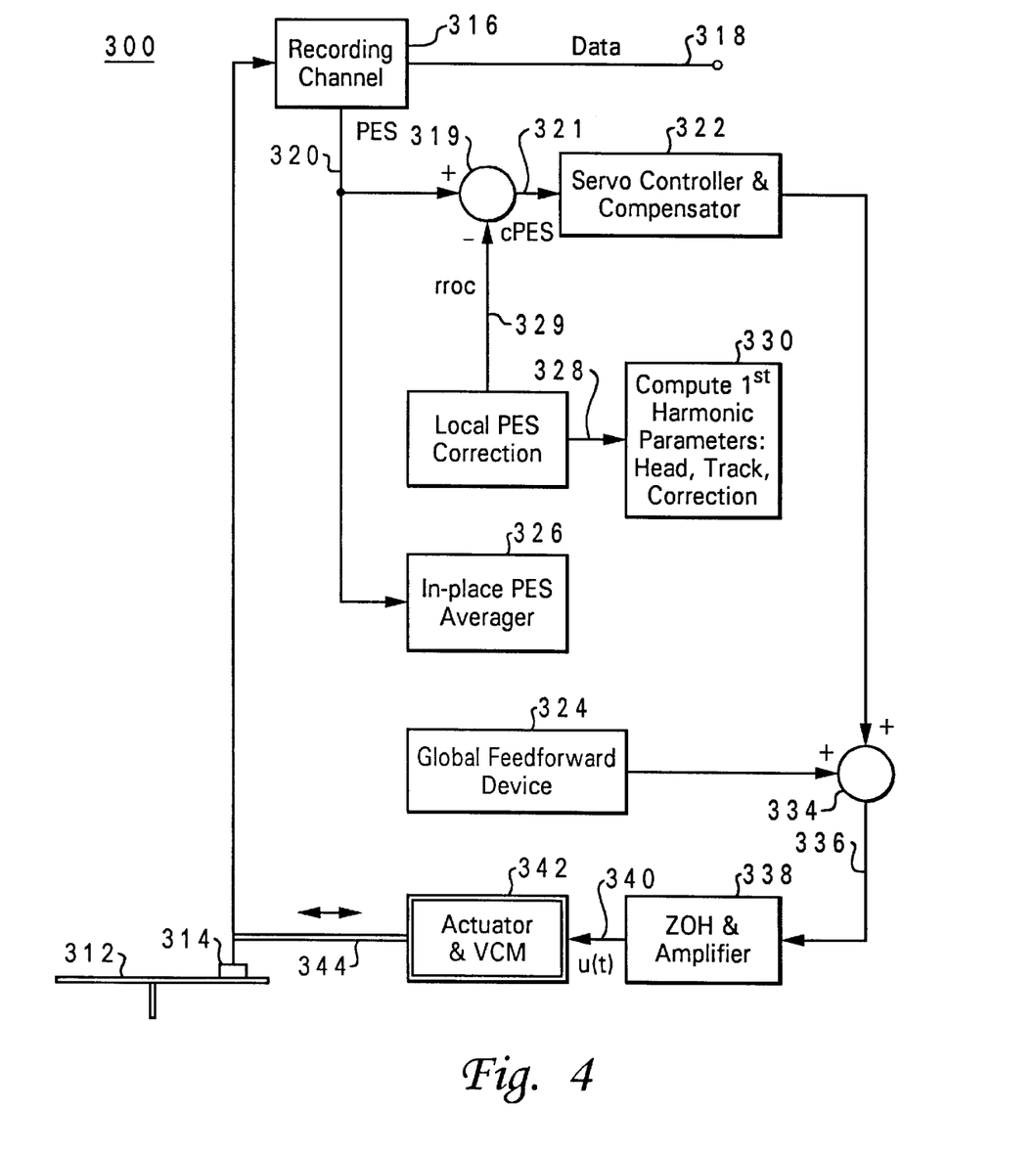
FIG. 4 is a block diagram of one embodiment of a position error signal (PES) correction device constructed in accordance with the present invention.

The local PES-correction device 300 used by the present invention may be further understood with reference to FIG. 4. When disks 312 are spinning, heads 314 are again in a track-following control mode positioned via arm/suspension links 344 by an actuator and voice-coil motor (VCM) 342. Customer data and servo information is interlaced in periodically N times per disk revolution. The readback signal from user-selected head 314 is fed into a recording channel 316. The read signal is time-partitioned into user-data on line 318, and raw position error signal (PES) information on line 320 several times (N) per disk revolution. When an arbitrary track (jj) is selected, in the track-following mode, the measured raw PES(n,jj) on line 320 is corrected by subtracting a local PES-correction sequence rroc(n,jj) on line 329 in a summer 319. The difference cPES on line 321 at the output of summer 319, which is the corrected PES, is entered into a servo controller and compensator 322. The local PES-correction sequence rroc(n,jj) in 328 is computed from equation (4) with information from in-place average 326 and the local first harmonic sequence generator 330:

$$rroc(n,jj)=rro(n,jj)-a(1,jj)*\cos(w_o*n)-b(1,jj)*\sin(w_o*n) \quad (4)$$

where the first harmonic DFS coefficients are computed from equation (3) via the first harmonic DFT, i.e., RRO(1,jj), computed by Goertzel's algorithm. The local PES-correction, rroc(n,jj), contains all harmonics except the first harmonic.

Servo controller and compensator 322 provides a control output that is added to the output of a global feedforward device 324 in summer 334. The summer output 336 is directed into ZOH and amplifier 338 and its output continuous control-current u(t) serves as the appropriate control for the actuator and VCM 342 to position head 314 directly over local track jj on disk 312.

Figure 5:
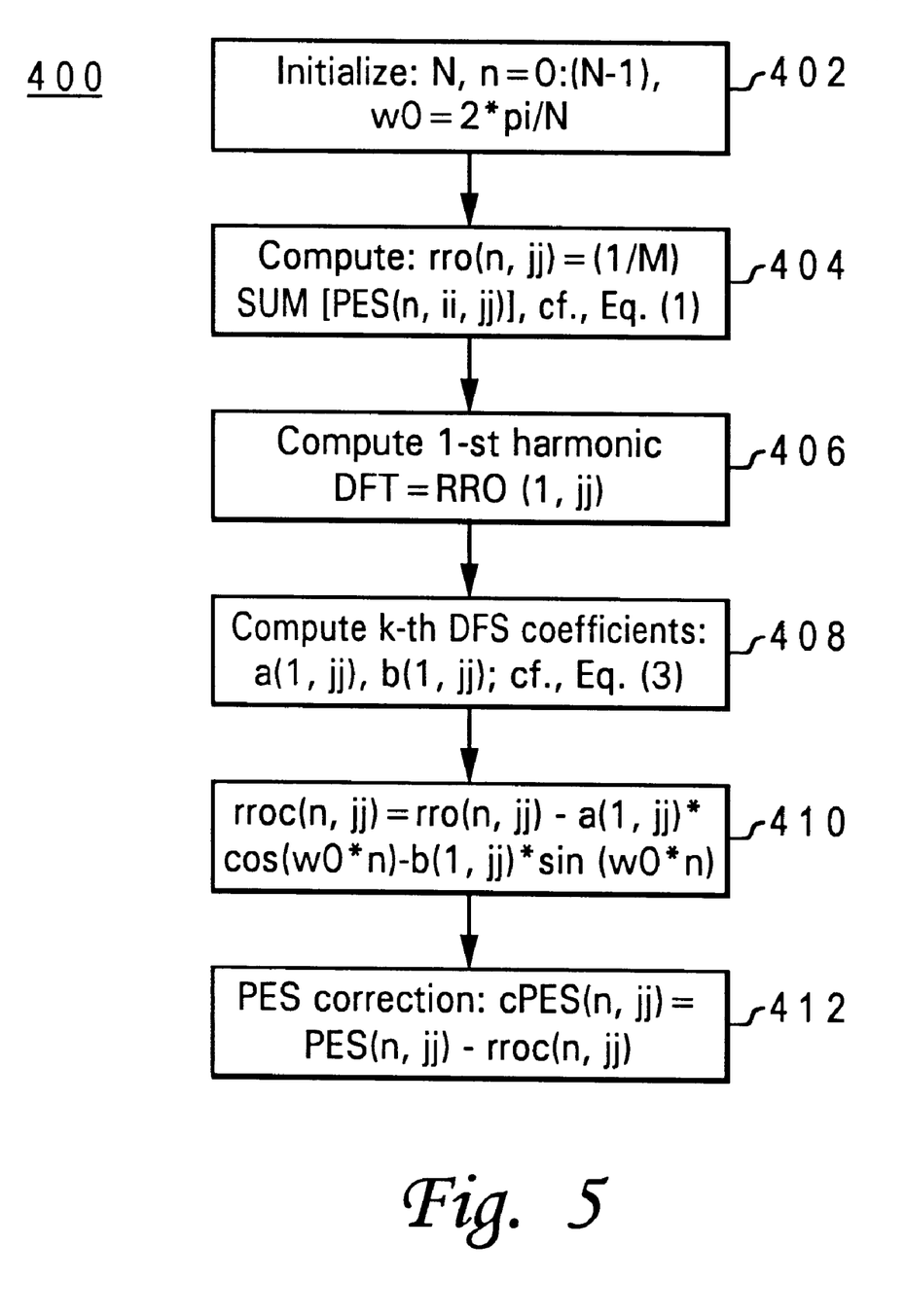
FIG. 5 is a flow chart depicting operation of the local PES correction performed by the device of FIG. 4.

The local PES-correction process 400 is explained further in the flow chart of FIG. 5. Initialization of variables in accomplished in block 402. The number of sectors N, the index n=0:(N−1), and the discrete-time frequency $w_o=2\pi/N$ are initialized. The local, in-place (per sector) average sequence rro(n,jj) is computed in block 404, using equation (1), from the measured raw PES(n,ii,jj) on local track jj over M complete revolutions (e.g., 10 revolutions). The first harmonic discrete Fourier transform (DFT) RRO(1,jj), in block 406 is calculated from Goertzel's algorithm or another discrete Fourier transform. In block 408, the discrete Fourier series (DFS) coefficients for the local first harmonic are calculated using equation (3). These local coefficients a(1,jj) and b(1,jj) are used in block 410 to subtract the first harmonic rro(n, 1,jj) from the total repeatable runout sequence rro(n,jj) to produce the RRO-correction sequence rroc(n,jj). Again, the harmonic $\cos(k*w_o*n)$-sequence and $\sin(k*w_o*n)$-sequence are generated by indexing a first-order sine/cosine table as described further below. Finally, the raw PES(n,jj) is corrected, as shown, in block 412.

Figure 6:
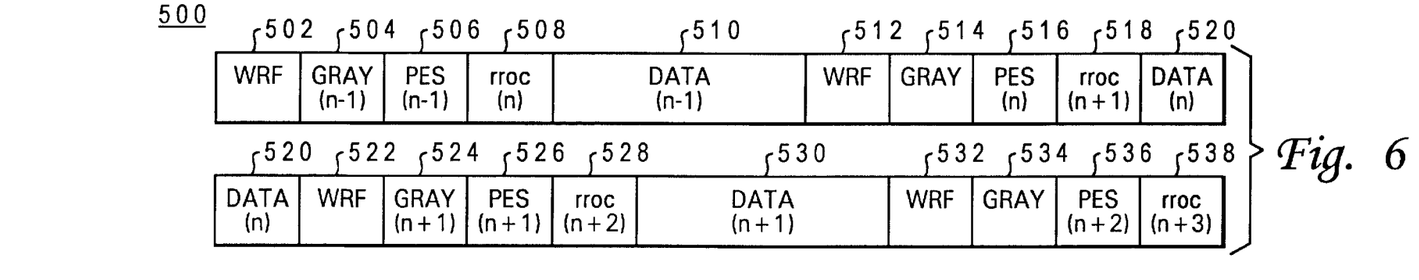
FIG. 6 is a pictorial representation of one manner of storing local PES-correction values in one or more sectors of a DASD in accordance with the present invention.

As can be seen from FIG. 6, one possible method 500 for storing the local PES-correction value rroc(n,jj) is to use the information as look-ahead. The local PES-correction rroc(n, jj) in 508 is stored in the sector (n−1) defined by blocks 502, 504, 506, 508 and 510; the local PES-correction rroc(n+1,jj) in 516 is stored in the sector (n) defined by blocks 512, 514, 516, 518 and 520; etc. The required storage is only two bytes (12–16 bits) of information per sector. If the PES-correction value rro(n,jj) cannot be read, then zero may be used as a default for the corrected PES, cPES(n,jj). See line 321 in FIG. 3.

Figure 7A:
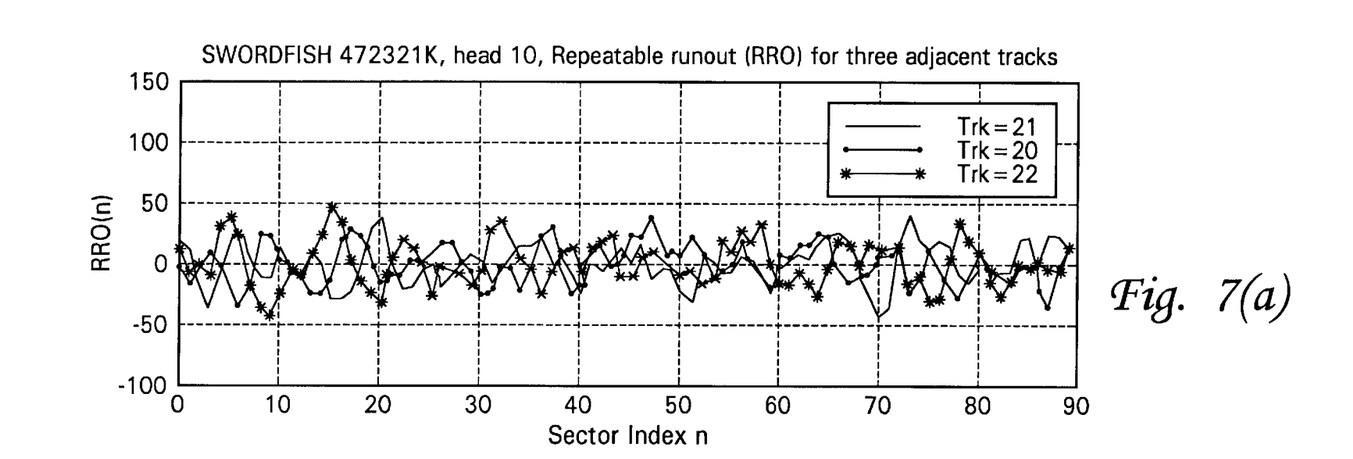
FIGS. 7(a) and 7(b) are graphs illustrating the local repeatable position errors (RRO) on three adjacent tracks of a simulated HDD, and the RRO differences.
Figure 7B:
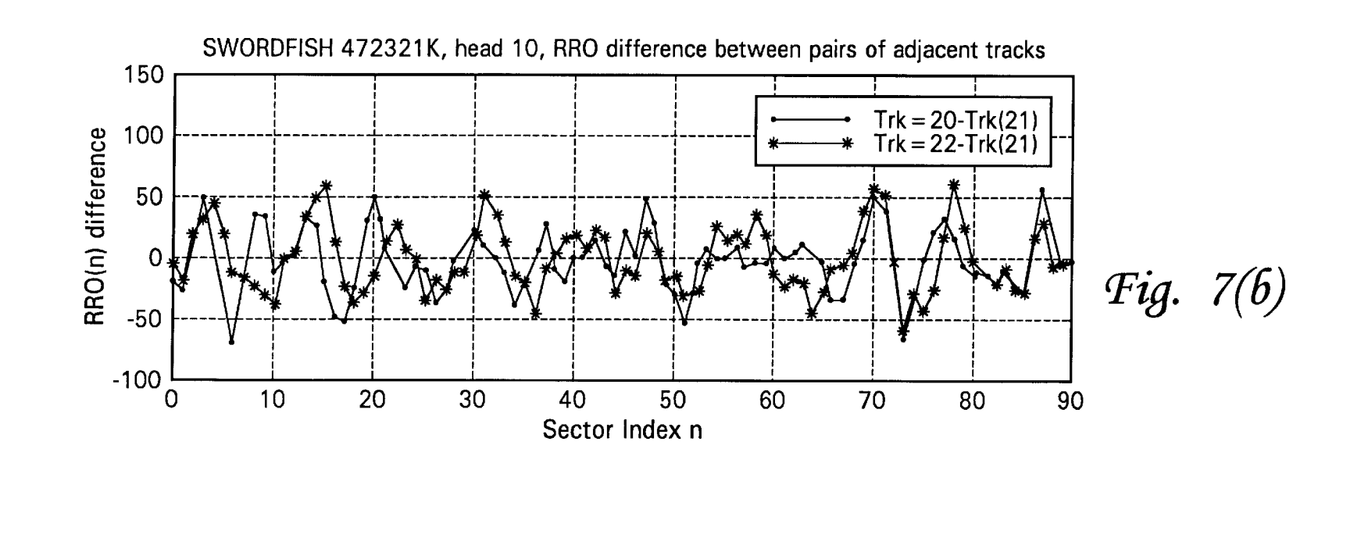

FIGS. 7(a) and 7(b) shows the local RRO on three adjacent tracks on an actual disk drive, tracks 20, 21 and 22. The variations in amplitude and phase of three local RROs are striking. The extreme values of the RROs are bounded with ±50 units, which is-notable as it degrades the WWTMR and, thus, reduces the obtainable track density due to squeezes between tracks. The increase in WWTMR may be determined by inspecting the increased standard deviation for the differences between tracks. There is about a 50% increase in standard deviation (ACRMS) for the differential RRO-cases.

Figure 8A:
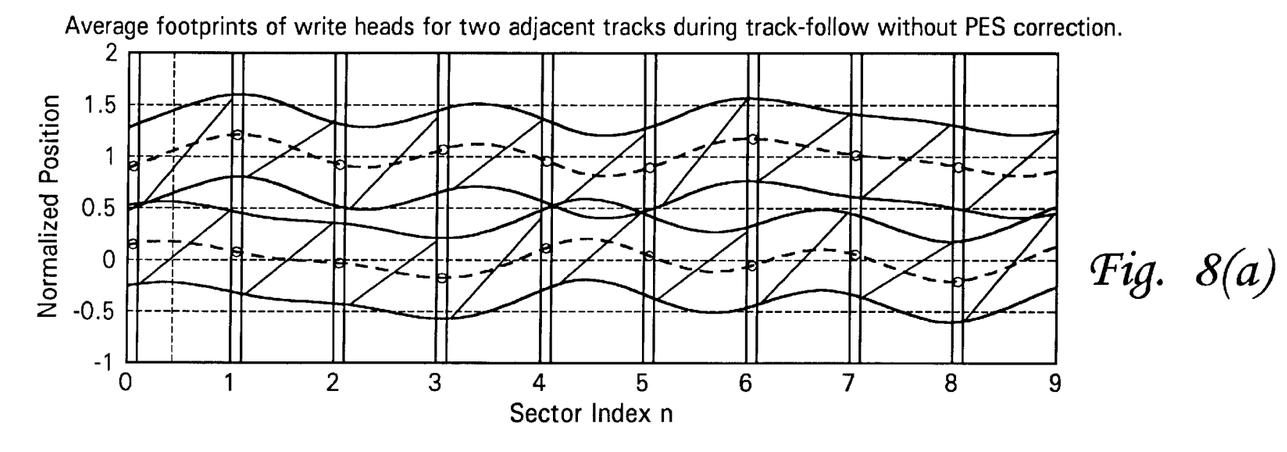
FIGS. 8(a) and 8(b) are graphs illustrating how the average footprint of the written data-portion of an HDD sector falls on a circular track, with FIG. 8(a) showing an average track-squeeze problem, and FIG. 8(b) showing how the present invention solves the average squeeze problem.
Figure 8B:
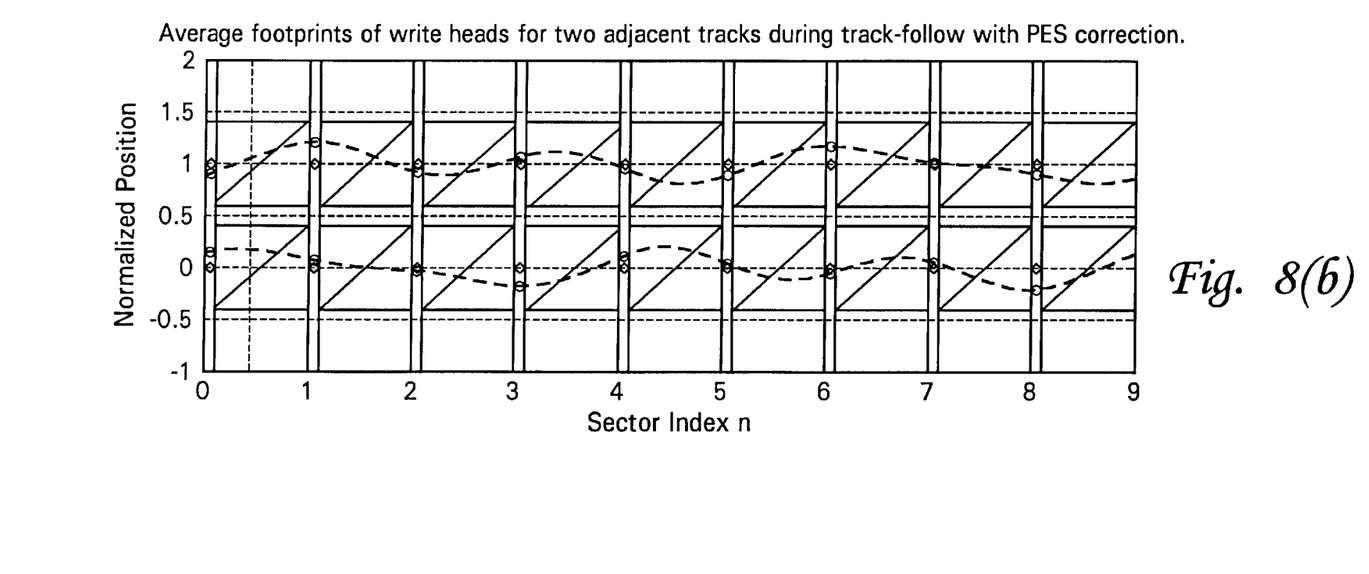

Using the foregoing PES-correction method generally corrects the mean of all raw PES values to zero. That is, referring to the local cPES on line 321 in FIG. 4, the mean (average) value of cPES(n,jj) is zero. The implication of this is that the average position (footprint) of the written data-portion of the sector falls on a circular track, as shown conceptually in FIG. 8(b), where the average corrected PES values (simulated) are indicated by the diamond-shaped symbols. FIG. 8(a) shows a clear average track-squeeze problem between the two adjacent tracks in customer data sector 4. This track-squeeze will likely result in data error due to in-band noise, which is the penalty for trying to follow the local track. FIG. 8(b) shows that the PES-correction method of the present invention solves the average squeeze problem. The PES-correction method causes much less power to be expended in the actuator 342, since the actuator does not follow the local repeatable runout RRO(n,jj).

Local PES-correction solves the above problem, but requires the storage of the local PES-correction values, rroc(n,jj), as suggested in FIG. 6. The raw PES measurements are taken in the track-following mode under global feedforward as suggested by FIG. 4. The PES-correction values, rroc(n,jj), change very little with the useful life of the disk drive, unless a disturbance of a grown defect is locally present in one or more of the tracks. Thus, for all practical purposes, the PES-correction values have only to be entered once. If PES-correction values are averaged over 10 revolutions and written at the next revolution, the time to write a 10-disk DASD with 10,000 tracks and 90 sectors spinning at 10,000 RPM can be computed. Allowing less that 1 millisecond to change tracks, the required time is approximately 11*(1/10,000)*10,000=11 minutes per surface, for a total of 3 hours and 40 minutes for 20 surfaces. One could also complete PES-corrections for the first 1,000 cylinders at the OD, and complete the remainder of the PES-corrections during idle moments under normal disk drive operations in the customer's office. Each cylinder requires only 1.33 seconds for measuring, computing and storing the PES-corrections. Local PES data may be stored only once or twice per track in a compressed format, which would allow one to know local PES corrections for RRO in advance, and save disk space.

While the local PES-correction method might be superior for a single actuator structure, there may be other multi-actuator structures that can combine local PES-correction for the main actuator and local feedforward for a piggyback actuator. Local motion of the piggyback actuator will contribute minutely to major structural resonances in the DASD. The use of both methods may have added benefits for future disk drives.

Figure 9:
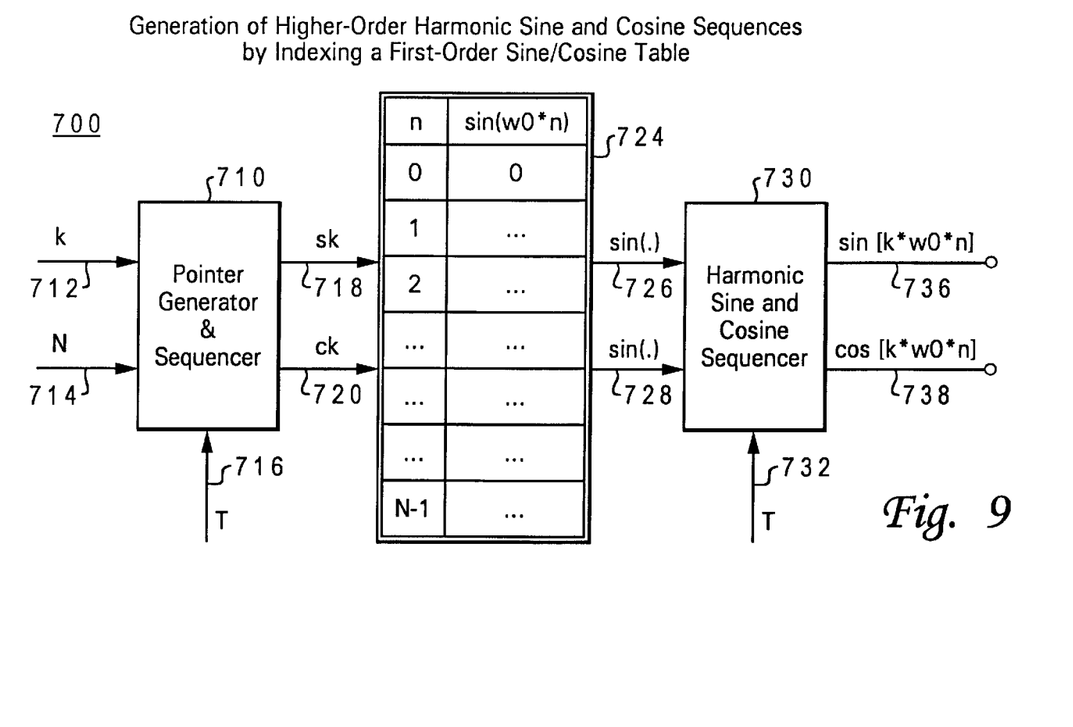
FIG. 9 is a block diagram of one embodiment of a higher-harmonic sine and cosine generation system constructed in accordance with the present invention.

With further reference to FIG. 9, there is depicted a method of generating finite-length, higher-order harmonic sine and cosine sequences for use with the foregoing correction methods. The higher-order-sequences are generated by indexing one period of a single finite-length, first-order sine or cosine table. This approach eliminates more costly and time-consuming devices for complex multiplications or generation of higher-order harmonic sine and cosine sequences.

This aspect of the present invention relates to the numerical content of values in discrete-time, higher-order harmonic sequences. It has been found that all the values contained in higher-order harmonic sine sequences (or cosine sequences) were members of one period N of a first-order sine-sequence set. The sequential index order of the values for a higher-order sequence is, however, different from the index order of the first-order harmonic sequence. This discovery means that all the values required in any higher-order harmonic sequence are already present in the first-order harmonic sequence.

Thus, a first-order harmonic sine-sequence of period N shown in equation (5)

$$s(n)=\sin(w_0*n), \tag{5}$$

where $w_0=2\pi/N$ and $0 \leq n \leq (N-1)$, has all the numeric values required for computing $\sin(2*w_0*n)$, $\sin(3\pi*n)$, ..., $\sin(25*w_0*n)$, etc. Therefore, the higher-order harmonics over the period N can be computed via a simple sine-lookup table $s(n)$ using pointer-indices "sk." The pointer index value is computed modulo-N from the equation $$sk=(k*n)\text{mod}(N). \tag{6}$$

Similarly, an first-order harmonic cosine-sequence of period N in equation (7)

$$c(n)=\cos(w_0*n), \tag{7}$$

where $w_0=2\pi/N$ and $0 \leq n \leq (N-1)$, has all the numeric values required for computing $\cos(2*w_0*n)$, $\cos(3\pi*n)$, ..., $\cos(25*w_0*n)$, etc. The higher-order harmonics over the period N can be computed via a simple cosine-lookup table $c(n)$ using pointer-indices "ck" identical to the pointer sk for the sine table.

In the special case where N is a multiple of four, then only one table (a sine table or a cosine table) is required. If a sine table is used, then the pointer index sk for higher-order harmonic sine sequences, $\sin(k*w_0*n)$, is given by equation (6). The pointer index ck for higher-order harmonic cosine sequences, i.e., $\cos(2*w_0*n)$, is given by the integer portion of the equation $$ck=[(N+4*k*n)\text{mod}(4*N)]/4. \tag{8}$$

On the other hand, if a cosine-table is used, then the pointer index ck for the higher-order harmonic cosine sequences is given by equation (6). The pointer index sk for higher-order harmonic sine-sequences, i.e., $\sin(k*w_0*n)$, is given by the integer portion of the equation $$sk=[(3*N+4*k*n)\text{mod}(4*N)]/4. \tag{9}$$

A simple example, for N=16 and k=7, is given below using one period of a sine table and one period of a cosine table (generation of sin(7p) and cos(7p) from one period of a first-order sine table and one period of a cosine table). In this case the pointer index for the sine table is sk=s7, and ck=c7 for the cosine table. Sin(7p) and cos(7p) are derived from a sin(p) table and a cos(p) table, where p=$w_0$*n, and $0 \leq n \leq (N-1)$.

| n | sin (p) | s7 | sin (7p) | c7 | cos (7p) | cos (p) | s7 | sin (7p) | c7 | cos (7p) |
|---|---|---|---|---|---|---|---|---|---|---|
| 0 | 0.0000 | 0 | 0.0000 | 4 | 1.0000 | 1.0000 | 12 | 0.0000 | 0 | 1.0000 |
| 1 | 0.3827 | 7 | 0.3827 | 11 | −0.9239 | 0.9239 | 3 | 0.3827 | 7 | −0.9239 |
| 2 | 0.7071 | 14 | −0.7071 | 2 | 0.7071 | 0.7071 | 10 | −0.7071 | 14 | 0.7071 |
| 3 | 0.9239 | 5 | 0.9239 | 9 | −0.3827 | 0.3827 | 1 | 0.9239 | 5 | −0.3827 |
| 4 | 1.0000 | 12 | −1.0000 | 0 | 0.0000 | 0.0000 | 8 | −1.0000 | 12 | 0.0000 |
| 5 | 0.9239 | 3 | 0.9239 | 7 | 0.3827 | −0.3827 | 15 | 0.9239 | 3 | 0.3827 |
| 6 | 0.7071 | 10 | −0.7071 | 14 | −0.7071 | −0.7071 | 6 | −0.7071 | 10 | −0.7071 |
| 7 | 0.3827 | 1 | 0.3827 | 5 | 0.9239 | −0.9239 | 13 | 0.3827 | 1 | 0.9239 |
| 8 | 0.0000 | 8 | 0.0000 | 12 | −1.0000 | −1.0000 | 4 | 0.0000 | 8 | −1.0000 |
| 9 | −0.3827 | 15 | −0.3827 | 3 | 0.9239 | −0.9230 | 11 | −0.3827 | 15 | 0.9239 |
| 10 | −0.7071 | 6 | 0.7071 | 10 | −0.7071 | −0.7071 | 2 | 0.7071 | 6 | −0.7071 |
| 11 | −0.9239 | 13 | −0.9239 | 1 | 0.3827 | −0.3827 | 9 | −0.9239 | 13 | 0.3827 |
| 12 | −1.0000 | 4 | 1.0000 | 8 | 0.0000 | 0.0000 | 0 | 1.000 | 4 | 0.0000 |
| 13 | −0.9239 | 11 | −0.9239 | 15 | −0.3827 | 0.3827 | 7 | −0.9239 | 11 | −0.3827 |

-continued

| n | sin (p) | s7 | sin (7p) | c7 | cos (7p) | cos (p) | s7 | sin (7p) | c7 | cos (7p) |
|---|---------|----|----------|----|----------|---------|----|----------|----|----------|
| 14 | −0.7071 | 2 | 0.7071 | 6 | 0.7071 | 0.7071 | 14 | 0.7071 | 2 | 0.7071 |
| 15 | −0.3827 | 9 | −0.3827 | 13 | −0.9239 | 0.9239 | 5 | −0.3827 | 9 | −0.9239 |

Observations of the pointer indices sk and ck in the previous example, with N=16, show that if the table index series n is catenated several times as shown in equation (10)

$$\{0 \ \ 1 \ \ 2 \ \ 3 \ \ 4 \ \ 5 \ \ 6 \ \ 7 \ \ 8 \ \ 9 \ \ 10 \ \ 11 \ \ 12 \ \ 13 \ \ 14$$
$$15 \ \ 0 \ \ 1 \ \ 2 \ \ 3 \ \ 4 \ \ 5 \ \ 6 \ \ 7 \ \ 8 \ \ 9 \ \ 10 \ \ 11 \ \ 12 \ \ 13$$
$$14 \ \ 15 \ \ 0 \ \ 1 \ \ 2 \ \ 3 \ \ 4 \ \ 5 \ \ 6 \ \ 7 \ \ 8 \ \ 9 \ \ 10 \ \ 11 \ \ 12$$
$$13 \ \ 14 \ \ 15 \ \ 0 \ \ 1 \ \ 2 \ \ 3 \ \ 4 \ \ 5 \ \ 6 \ \ 7 \ \ 8 \ \ 9 \ \ 10 \ \ 11$$
$$12 \ \ 13 \ \ 14 \ \ 15 \ \ 0 \ \ 1 \ \ 2 \ \ 3 \ \ 4 \ \ ...\} \tag{10}$$

then the pointer index s7 for the seventh harmonic, sin(7p), can be found from the sine table by taking every seventh element from the sequence in equation (10), starting with the first element. The result is $$s7=\{0 \ 7 \ 14 \ 5 \ 12 \ 3 \ 10 \ 1 \ 8 \ 15 \ 6 \ 13 \ 4 \ 11 \ 2 \ 9\} \tag{7}$$

The pointer index c7 for the seventh harmonic, cos(7p), can be found from the sine table by taking every seventh element from the sequence in equation (6), starting with the fifth (N/4+1) element. The result is $$c7=\{4 \ 11 \ 2 \ 9 \ 0 \ 7 \ 14 \ 5 \ 12 \ 3 \ 10 \ 1 \ 8 \ 15 \ 6 \ 13\} \tag{8}$$

For the third harmonic, sin(3p), we would pick every third element from the catenated index sequence for sk, and cos(3p) requires every third element skipping the first N/4 elements in equation (10), and so on.

FIG. 9 shows conceptually the higher-harmonic sine and cosine generation system 700. A pointer generator and sequencer 710 computes the pointer-indices according to equations (7) and (8), using user-selected values for the harmonic number k on line 712 and the first-harmonic period N on line 714. The periodic pulsing of line 716 releases the ordered pointer-sequence values for sine (sk) on line 718 and for cosine (ck) on line 720, at regular intervals. The two pointer-sequences on lines 718 and 720 access the sine table 724, and the corresponding table-entry values are outputted on lines 726 and 726. Harmonic sine and cosine sequencer 730 accepts the table values on lines 718 and 720 and simultaneously releases the harmonic sine and cosine sequences, sin(k*w$_0$*n) and cos(k*w$_0$*n), on lines 736 and 738. The duration of these outputs on lines 736 and 738 are controlled by the user by pulsing of line 732. The harmonic-sequence values will repeat for every N elements. That is, the periodicity of the harmonic sequences obeys sin(k*w$_0$*n)=sin(k*w$_0$*(n+N)) and cos(k*w$_0$*n)=cos(k*w$_0$*(n+N)).

A primary advantage of this technique is the very high speed and computational simplicity at which harmonic sine and cosine sequences can be outputted simultaneously using a small amount of storage and microprocessor cycles. Although this invention has numerous applications in digital signal processing, image processing, and video processing, it is particularly useful for local feedforward and position error signal correction in a high performance DASD. Such correction in turn eliminates the STW "frozen-in" effects upon the actuator servo control, and reduces the average power in the actuator to reduce the local heating or increase the maximum DASD operations per unit time. The local PES-correction and local feedforward do not introduce a phase lag, so the phase margin is retained (which is not the case when PES-filtering is used). Disk drives employing the PES-correction in a RAID (redundant array of inexpensive disks) structure will operate much more quietly, i.e., they will emanate much less self-vibrations. Additionally, the chances of re-exciting suspension/arm resonance frequencies, due to frozen-in resonance disturbances in the servo-patterns, are greatly reduced, thereby decreasing the local NRRO.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of positioning a read/write head using a generated higher-order trigonometric sequence, comprising the steps of:

constructing a table having a plurality of values arranged as a finite-length, first-order trigonometric sequence;

indexing the table to yield a different sequence of the values, based on an order number of a desired higher-order harmonic;

catenating the values according to the different sequence to yield a higher-order trigonometric sequence whose order is the order number;

calculating a local PES-correction value for at least one track of a direct access storage device, using the higher-order trigonometric sequence; and positioning a read/write head of the direct access storage device over the track using the local PES-correction value.

2. The method of claim 1 wherein:

said constructing step constructs a table having a finite-length, first-order sine sequence; and said catenating step yields a higher-order sine sequence.

3. The method of claim 1 wherein:

said constructing step constructs a table having a finite-length, first-order cosine sequence; and said catenating step yields a higher-order cosine sequence.

4. The method of claim 1 wherein:

said constructing step constructs a table having a period N; and said indexing step computes a plurality of pointer indices equal to (k*n)mod(N), where k is the order number, and $0 \leq n < N$.

5. The method of claim 4 wherein:

N is a multiple of 4;

said constructing step constructs a table having a finite-length, first-order sine sequence; and said catenating step yields a higher-order cosine sequence.

6. The method of claim 4 wherein:

N is a multiple of 4;

said constructing step constructs a table having a finite-length, first-order cosine sequence; and said catenating step yields a higher-order sine sequence.

7. The method of claim 1 further comprising the step of storing the PES-correction value for the track on a sector of the direct access storage device.

8. A direct access storage device including an electromechanical apparatus, comprising:

a rotatable assembly mounted for rotation about an axis;

a moveable follower assembly;

a position controller for said moveable follower assembly, said position controller controlling the position of said moveable follower to register a first feature of said moveable follower with a second feature of said rotatable assembly as said rotatable assembly rotates about said axis, said position controller correcting harmonic misregistration between said first and second features by calculating a correction value using a higher-order trigonometric sequence, said position controller generating said higher-order trigonometric sequence by: (a) constructing a table having a plurality of values arranged as a finite-length, first-order trigonometric sequence; (b) indexing the table to yield a different sequence of the values, based on an order number of a desired higher-order harmonic; and (c) catenating the values according to the different sequence to yield a higher-order trigonometric sequence whose order is the order number.

9. The apparatus of claim 8 wherein:

said position controller constructs a table having a finite-length, first-order sine sequence; and said position controller catenates the values to yield a higher-order sine sequence.

10. The apparatus of claim 8 wherein:

said position controller constructs a table having a finite-length, first-order cosine sequence; and said position controller catenates the values to yield a higher-order cosine sequence.

11. The apparatus of claim 8 wherein:

said position controller constructs a table having a period N; and said position controller indexes the table by computing a plurality of pointer indices equal to (k*n)mod(N), where k is the order number, and $0 \leq n < N$.

12. The apparatus of claim 11 wherein:

N is a multiple of 4;

said position controller constructs a table having a finite-length, first-order sine sequence; and said position controller catenates the values to yield a higher-order cosine sequence.

13. The apparatus of claim 11 wherein:

N is a multiple of 4;

said position controller constructs a table having a finite-length, first-order cosine sequence; and said position controller catenates the values to yield a higher-order sine sequence.

14. The apparatus of claim 8 wherein said electromechanical apparatus is a direct access storage device, wherein said first feature of said moveable follower is a data access transducer of said direct access storage device, and wherein said position controller calculates a local PES-correction value for at least one track of said direct access storage device, using the higher-order trigonometric sequence.

15. The apparatus of claim 14 further comprising means for storing the PES-correction value for the track on a sector of the direct access storage device.

16. A direct access storage device comprising:

an enclosure;

at least one disk having at least one media-bearing surface, said media-bearing surface having at least one track;

means for rotatably supporting said disk within said enclosure;

a read/write head;

an arm/suspension assembly supporting said read/write head;

means for actuating said arm/suspension assembly to position said read/write head over said track of said disk; and means for controlling said actuating means, said controlling means including means for constructing a table having a plurality of values arranged as a finite-length, first-order trigonometric sequence, means for indexing the table to yield a different sequence of the values, based on an order number of a desired higher-order harmonic, means for catenating the values according to the different sequence to yield a higher-order trigonometric sequence whose order is the order number, and means for calculating a local PES-correction value for said track, using the higher-order trigonometric sequence.

* * * * *